(12) United States Patent
Yeo et al.

(10) Patent No.: US 11,301,040 B2
(45) Date of Patent: Apr. 12, 2022

(54) DIRECT MANIPULATION OF DISPLAY DEVICE USING WEARABLE COMPUTING DEVICE

(71) Applicant: Google LLC, Mountain View, CA (US)

(72) Inventors: Hui Shyong Yeo, Mountain View, CA (US); Xuelin Huang, Mountain View, CA (US); Wenxin Feng, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 8 days.

(21) Appl. No.: 16/765,229

(22) PCT Filed: Dec. 19, 2019

(86) PCT No.: PCT/US2019/067603
§ 371 (c)(1),
(2) Date: May 19, 2020

(87) PCT Pub. No.: WO2021/126223
PCT Pub. Date: Jun. 24, 2021

(65) Prior Publication Data
US 2021/0318754 A1 Oct. 14, 2021

(51) Int. Cl.
*G09G 5/00* (2006.01)
*G06F 3/01* (2006.01)
(Continued)

(52) U.S. Cl.
CPC ............ *G06F 3/014* (2013.01); *G06F 3/017* (2013.01); *G06F 3/0325* (2013.01); *G06F 3/042* (2013.01); *G06F 3/0481* (2013.01)

(58) Field of Classification Search
CPC ........ G06F 3/014; G06F 3/0481; G06F 3/017; G06F 3/042; G06F 3/0325
See application file for complete search history.

(56) References Cited

U.S. PATENT DOCUMENTS

| 10,191,543 B2 | 1/2019 | Priyantha et al. |
| 2006/0209013 A1 | 9/2006 | Fengels |
| | (Continued) | |

FOREIGN PATENT DOCUMENTS

| CN | 103995592 A | 8/2014 |
| KR | 10-2012-0008367 A | 1/2012 |
| | (Continued) | |

OTHER PUBLICATIONS

Response to Communication Pursuant to Rules 161(1) and 162 EPC dated Aug. 28, 2020 from counterpart European Application No. 19842944.1, filed Feb. 5, 2021, 14 pp.

(Continued)

*Primary Examiner* — Adam R. Giesy
(74) *Attorney, Agent, or Firm* — Shumaker & Sieffert, P.A.

(57) ABSTRACT

An example method includes determining, by one or more processors, an estimated location of a wearable computing device on a display device that is not presence-sensitive, wherein the wearable computing device is configured to be worn on a wrist of a user; causing the display device to output, at the estimated location, a graphical pattern; determining, by the one or more processors and based on optical data generated by an optical sensor of the wearable computing device, a refined location of the wearable computing device; and utilizing, by the one or more processors, the refined location of the wearable computing device as a location of user input for an application outputting a graphical user interface via the display device.

21 Claims, 8 Drawing Sheets

(51) Int. Cl.
   *G06F 3/03*     (2006.01)
   *G06F 3/042*    (2006.01)
   *G06F 3/0481*   (2022.01)

(56) References Cited

U.S. PATENT DOCUMENTS

| | | | |
|---|---|---|---|
| 2008/0235565 A1* | 9/2008 | Ackerman | G06F 40/134 715/205 |
| 2010/0199232 A1 | 8/2010 | Mistry et al. | |
| 2011/0199389 A1 | 8/2011 | Lu et al. | |
| 2011/0225534 A1* | 9/2011 | Wala | G06F 3/0425 715/772 |
| 2015/0258431 A1 | 9/2015 | Stafford et al. | |
| 2015/0277557 A1 | 10/2015 | Raffa et al. | |
| 2016/0357265 A1 | 12/2016 | Maani | |
| 2017/0123510 A1 | 5/2017 | Parham | |
| 2018/0203660 A1 | 7/2018 | Hwang et al. | |

FOREIGN PATENT DOCUMENTS

| | | |
|---|---|---|
| KR | 10-2016-0100527 A | 8/2016 |
| KR | 10-2017-0007963 A | 1/2017 |
| KR | 10-2018-0037511 A | 4/2018 |
| KR | 10-2054586 B1 | 12/2019 |

OTHER PUBLICATIONS

Sneiderman, "Direct Manipulation: A Step Beyond Programming Language," in Computer, vol. 16, No. 8, pp. 57-69, Aug. 1983, 13 pages.

Ishii et al., "Tangible Bits: Towards Seamless Interfaces between People, Bits and Atoms," in Proceedings of the ACM SIGCHI Conference on Human Factors in Computer Systems, ACM, Mar. 22-27, 1997, 8 pages.

Khurana et al., "Detachable Smartwatch: More Than A Wearable," Proc. ACM Interact Mob. Wearable Ubiquitous Technol., vol. 3, No. 2, Article 50, Jun. 2019, 14 pages.

Xandr Design, "POISE Detachable Smartwatch," published by Indiegogo, Inc., Downloaded Sep. 2020, 15 pages.

International Search Report and Written Opinion of International Application No. PCT/US2019/067603, dated Aug. 27, 2020, 15 pp.

Notice of Preliminary Rejection, and translation thereof, from counterpart Korean Application No. 10-2020-7016633, dated Jun. 18, 2021, 12 pp.

Allowance of Patent from counterpart Korea, Republic of Application No. 10-2020-7016633 dated Nov. 2, 2021, 6 pp.

* cited by examiner

DIRECT MANIPULATION OF DISPLAY DEVICE USING WEARABLE COMPUTING DEVICE

BACKGROUND

Direct manipulation of objects in a graphical user interface output by a display device may be a very natural way to facilitate user to computer interaction. Direct manipulation involves the acting on of displayed objects (e.g., tapping soft buttons, moving sliders, dragging icons). Some display devices include touchscreens that facilitate direct manipulation. However, many public kiosks, digital tabletops, laptops, televisions (e.g., in meeting rooms or classrooms) lack touchscreens. As such, users generally need to control these devices (i.e., non-touchscreen) via indirect manipulation, which includes using a mouse, a keyboard, or a remote pointing device.

SUMMARY

In general, this disclosure is directed to techniques for utilizing wearable computing devices to facilitate direct manipulation of objects in a graphical user interface output by a display device that is not presence-sensitive. For instance, as opposed to using a mouse or other indirect manipulation tool, a user may move a wearable computing device around on a display device in order to directly manipulate objects displayed at the display device. One or more sensors of the wearable computing device, such as one or more optical sensors and/or one or more motion sensors, may generate data as the wearable computing device is moved on the display device. A control device (e.g., that is causing the display device to output the graphical user interface) may determine a location of the wearable computing device on the display device based on the sensor data. The control device may then use the determined location of the wearable computing device as user input to manipulate objects included in the graphical user interface.

In this way, the techniques of this disclosure enable a user to directly manipulate objects displayed by a display device. By utilizing the determined location of the wearable computing device as user input, the control device may enable richer interactions with display devices that do not include touchscreens or other direct manipulation means.

As one example, a method includes determining, by one or more processors, an estimated location of a wearable computing device on a display device that is not presence-sensitive, wherein the wearable computing device is configured to be worn on a wrist of a user; causing the display device to output, at the estimated location, a graphical pattern; determining, by the one or more processors and based on optical data generated by an optical sensor of the wearable computing device, a refined location of the wearable computing device; and utilizing, by the one or more processors, the refined location of the wearable computing device as a location of user input for an application outputting a graphical user interface via the display device.

As another example, a control device includes one or more processors; and a memory comprising instructions that, when executed by the one or more processors, cause the one or more processors to determine an estimated location of a wearable computing device on a display device that is not presence-sensitive, wherein the wearable computing device is configured to be worn on a wrist of a user; cause the display device to output, at the estimated location, a graphical pattern; determine, based on optical data generated by an optical sensor of the wearable computing device, a refined location of the wearable computing device; and utilize the refined location of the wearable computing device as a location of user input for an application outputting a graphical user interface via the display device.

As another example, a computer-readable storage medium stores instructions that, when executed, cause one or more processors to determine an estimated location of a wearable computing device on a display device that is not presence-sensitive, wherein the wearable computing device is configured to be worn on a wrist of a user; cause the display device to output, at the estimated location, a graphical pattern; determine, based on optical data generated by an optical sensor of the wearable computing device, a refined location of the wearable computing device; and utilize the refined location of the wearable computing device as a location of user input for an application outputting a graphical user interface via the display device.

The details of one or more examples of the disclosure are set forth in the accompanying drawings and the description below. Other features, objects, and advantages will be apparent from the description and drawings, and from the claims.

DETAILED DESCRIPTION

Figure 1:
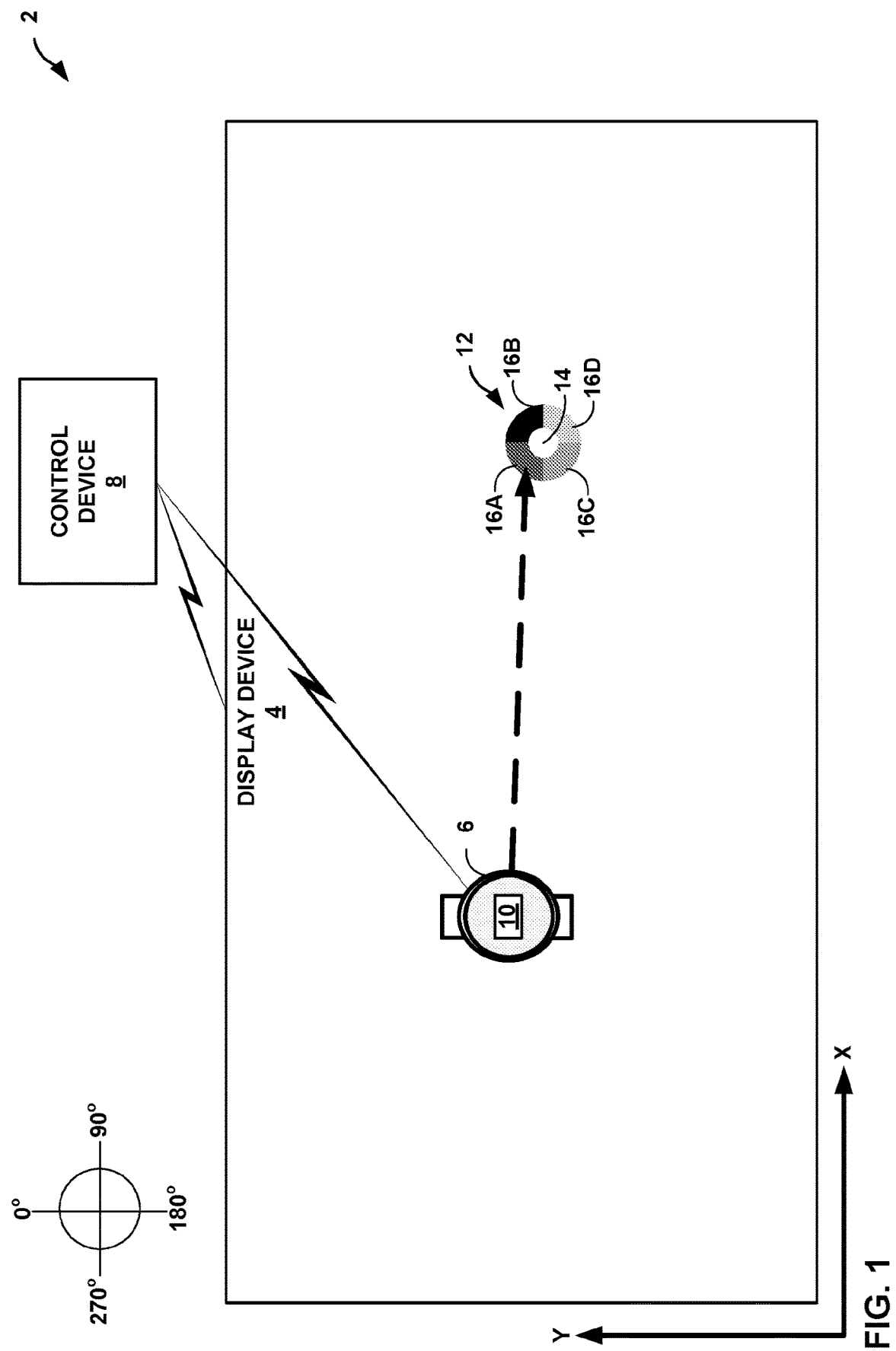
FIG. 1 is a system diagram illustrating a system that enables a wearable computing device to be used to facilitate direct manipulation of objects in a graphical user interface output by a display device, in accordance with one or more techniques of this disclosure

FIG. 1 is a system diagram illustrating a system that enables a wearable computing device to be used to facilitate direct manipulation of objects in a graphical user interface output by a display device, in accordance with one or more techniques of this disclosure. As shown in FIG. 1, system 2 includes display device 4, wearable computing device 6, and control device 8.

Display device 4 may be configured to display graphical information for viewing by one or more users. Examples of display device 4 include, but are not limited to, monitors, televisions, rear-projections screens, or any other device capable of displaying information. Display device 4 may form an output images using any suitable technology. Example image formation technologies include, but are not limited to, liquid crystal display (LCD), laser, light emitting diode (LED), organic light emitting diode (OLED), plasma, and the like.

Display device 4 may include components configured to generate the graphical information for display. For instance, display device 4 may be a so-called "smart display." Display device 4 may include one or more inputs (e.g., one or both of wired and wireless inputs) capable of receiving graphical information for display from an external device (e.g., control device 8). For instance, display device 4 may include one or more wired inputs (e.g., High-Definition Multimedia Interface (HDMI) inputs, one or more display-port inputs, one or more network connections (e.g., WIFI, BLUETOOTH, Ethernet, etc.), and/or one or more digital visual interface (DVI) inputs.

Control device 8 may be configured to cause display device 4 to output graphical information. For instance, control device 8 may cause display device 4 to display a graphical user interface that includes one or more graphical objects (e.g., buttons, keys, sliders, and the like). In some examples, control device 8 may be integrated into display device 4. For instance, where display device 4 is a "smart display" control device 8 may be integrated into display device 4. In other examples, control device 8 may be an external device to display device 4. For instance, control device 8 may output the graphical information to display device 4 via an input of display device 4. As one example, control device 8 may be a streaming stick plugged into an HDMI input of display device 4. As another example, control device 8 may be a mobile computing device (e.g., a smartphone) and may wirelessly stream the graphical information to display device 4.

Control device 8 may include one or more processors that may perform various computations to support operation of control device 8. For instance, one or more processors of control device 8 may execute an application that generates a graphical user interface, which control device 8 may cause to be displayed at display device 4.

In some examples, display device 4 may include one or more input components configured to enable a user to directly manipulate graphical objects displayed at display device 4. For instance, display device 4 may include a touch-sensitive or other presence-sensitive panel that detects user movements on or near display device 4. Where display device 4 includes a presence-sensitive panel, display device 4 may output representations of user input received via the presence-sensitive panel to control device 8. For instance, display device 4 may output a stream of (x,y) coordinate pairs to control device 8, the coordinate pairs representing locations on display device 4 at-which the presence-sensitive panel detected user input. Control device 8 may utilize the representations of user input provided by display device 4 as user input for an application executing at control device 8 that is outputting a graphical user interface being displayed at display device 4.

As discussed above, direct manipulation of displayed graphical objects may be desirable over indirect manipulation. For example, direct manipulation of graphical objects may feel more natural to the user than indirect manipulation. However, in some examples, display device 4 may not include any input components configured to enable a user to directly manipulate graphical objects displayed at display device 4. For instance, display device 4 may not be a so-called "touchscreen" and may not be considered a presence-sensitive display. As such, it may be desirable to enable direct manipulation of graphical objects displayed at display device 4 even when display device 4 is not a presence-sensitive display.

In accordance with one or more techniques of this disclosure, control device 8 may enable a user to use wearable computing device 6 to perform direct manipulation of graphical objects displayed at display device 4. Wearable computing device 6, (referred to simply as "wearable 6") may be a device configured to be worn by a user. In the example of FIG. 1, wearable 6 is a computerized watch. However in other examples, wearable 6 is a computerized fitness band/tracker, computerized eyewear, computerized headwear, a computerized glove, etc. As discussed below, in some examples, a device other than a wearable device may perform the functions of wearable 6.

Wearable 6 includes sensors 10 that may be configured to generate data representing one or more measured parameters. As discussed in further detail with reference to FIG. 2, sensors 10 may include one or more motion sensors and one or more optical sensors. Wearable 6 may include components configured to wirelessly transmit data generated by sensors 10 to one or more external devices, such as control device 8.

Control device 8 may determine a location of wearable 6 on display device 4 based on the sensor data received from wearable 6. For instance, control device 8 may determine an estimated location of wearable 6 on display device 4 (e.g., based on motion data generated by one or more motion sensors of sensors 10). As a user moves wearable 6 across display device 4, the motion sensors of wearable 6 may generate motion data that represents the movement of wearable 6. Control device 8 may process this motion data to determine a relative movement of wearable 6. For instance, based on accelerometer and/or gyroscopic data generated by the motion sensors, control device 8 may determine that wearable 6 has moved 6 inches with a heading of 95°. However, determining the location of wearable 6 on display device 4 based solely on motion data may present one or more disadvantages. For instance, even with an initially known location, control device 8 may use dead reckoning to determine subsequent locations, which may introduce more and more error over time. As such, in some examples, it may be desirable to determine the location of wearable 6 on display device 4 based on more than just motion data.

In some examples, in addition to or in place of motion data, control device 8 may determine the location of wearable 6 on display device 4 based on optical data generated by one or more optical sensors of wearable 6. For instance, control device 8 may cause display device 4 to output a graphical pattern at an estimated current location of wearable 6 on display device 4. As shown in FIG. 1, control device 8 may cause display device 4 to output graphical pattern 12, which includes a plurality of regions that each have a different optical characteristic (e.g., a different color, a different shade of color or brightness). The plurality of regions may include center region 14 and a plurality of border regions 16A-16D (collectively, "border regions 16") dispersed about center region 14. Control device 8 may use optical data received from wearable 6 to refine the estimate of the current location of wearable 6 on display device 4. Control device 8 may utilize the refined location as user input for an application executing at control device 8 that is outputting a graphical user interface being displayed at display device 4. Further details of one example technique for refining an estimated location of wearable 6 are discussed below with reference to FIGS. 4A-4F.

In some examples, control device 8 may determine the location of wearable 6 on display device 4 based on a combination of motion data and optical data. For instance, control device 8 may determine the initial estimated location of wearable 6 based on motion data and determine the refined location based on optical data.

Control device 8 may utilize the refined location of the wearable computing device as a location of user input for an application outputting a graphical user interface via display device 4. For instance, where an application executing at control device 8 outputs a graphical user interface including a graphical button at location x1,y1 on display device 4, the application may determine that the graphical button has been selected where the refined location is at x1,y1.

While illustrated in FIG. 1 as being a separate device, control device 8 may be a separate device, or may be integrated into display device 4 or wearable 6. As one example, where control device 8 is a separate device (i.e., that is different than display device 4 and wearable 6), control device 8 may be a laptop or smartphone that receives (e.g., wirelessly) sensor data from wearable 6, executes an application to generate a graphical user interface, causes display device 4 to display the graphical user interface, and generates user input for the application based on the received sensor data. As another example, where control device 8 is included in display device 4, the functionality described herein may be performed by one or more processors of display device 4. For instance, one or more processors of display device 4 may receive sensor data from wearable 6, execute an application to generate a graphical user interface, display (at display device 4) the graphical user interface, and generate user input for the application based on the received sensor data. As another example, where control device 8 is included in wearable 6, the functionality described herein may be performed by one or more processors of wearable 6. For instance, one or more processors of wearable 6 may obtain sensor data generated by sensors 10 of wearable 6, execute an application to generate a graphical user interface, cause display device 4 to display the graphical user interface (e.g., wirelessly transmit instructions to generate the user interface to display device 4), and generate user input for the application based on the received sensor data.

Figure 2:
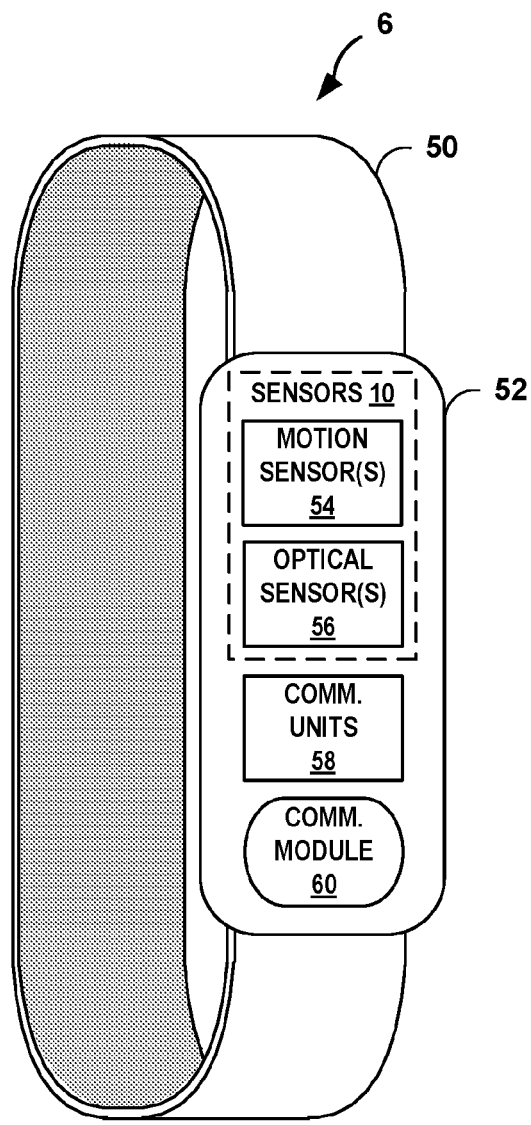
FIG. 2 is a block diagram illustrating a wearable computing device 6 that may be used to facilitate direct manipulation of displayed user interface components, in accordance with one or more aspects of the present disclosure

FIG. 2 is a block diagram illustrating wearable computing device 6 (referred to simply as "wearable 6") that may be used to facilitate direct manipulation of displayed user interface components, in accordance with one or more aspects of the present disclosure. In the example of FIG. 2, wearable 6 is a computerized watch. However in other examples, wearable 6 is a computerized fitness band/tracker, computerized eyewear, computerized headwear, a computerized glove, etc.

As shown in FIG. 2, in some examples, wearable 6 may include attachment component 50 and housing 52. Housing 52 of wearable 6 includes a physical portion of wearable 6 that houses a combination of hardware, software, firmware, and/or other electrical components of wearable 6. For example, FIG. 2 shows that within housing 52, wearable 6 may include sensors 10 (including motion sensors 54 and optical sensors 56), communication units 58, and communication module 60.

Attachment component 50 may include a physical portion of a wearable computing device that comes in contact with a body (e.g., tissue, muscle, skin, hair, clothing, etc.) of a user when the user is wearing wearable 6 (though, in some examples, portions of housing 52 may also come in contact with the body of the user). For example, in cases where wearable 6 is a watch, attachment component 50 may be a watch band that fits around a user's wrist and comes in contact with the skin of the user. In examples where wearable 6 is eyewear or headwear, attachment component 50 may be a portion of the frame of the eyewear or headwear that fits around a user's head, and when wearable 6 is a glove, attachment component 50 may be the material of the glove that conforms to the fingers and hand of the user. In some examples, wearable 6 can be grasped and held from housing 52 and/or attachment component 50.

Motion sensors 54 represent one or more motion sensors or input devices configured to detect indications of movement (e.g., data representing movement) associated with wearable 6. Examples of motion sensors 54 include accelerometers, speed sensors, gyroscopes, magnetometers, tilt sensors, barometers, proximity sensors, or any and all other types of input devices or sensors that can generate data from which wearable 6 can determine movement. In some examples, motion sensors 54 may be, or may be included in, an inertial measurement unit (IMU). Motions sensors 54 may generate "raw" motion data when housing 52 moves. The motion data may indicate one or more characteristics of movement including at least one of an acceleration, a distance traveled, a direction, a speed, a degree of rotation, or a degree of orientation.

Optical sensors 56 represent one or more devices configured to generate an electrical signal representative of light intensity. Examples of optical sensors 56 include, photodiodes, photoresistors, or any other device capable of transducing light into electrical signals. In some examples, one or more of optical sensors 56 may be included in a photoplethysmogram (PPG) sensor (e.g., a sensor that is used for heart rate monitoring). Optical sensors of optical sensors 56 that are included in the PPG sensor may be disposed on a surface of wearable 6 that is against a skin of a wearer of wearable 6 when wearable 6 is worn. For instance, where wearable 6 is a watch, optical sensors of optical sensors 56 that are included in the PPG sensor may be located on a bottom of the watch. In some examples, optical sensors 56 may be located somewhere on wearable 6 other than the surface of wearable 6 that is against the skin of the wearer of wearable 6 when wearable 6 is worn. For instance, optical sensors 56 may be included in a front facing camera (or other front facing (e.g., on the watch face) optical sensor) of wearable 6. In such examples, the user may utilize wearable 6 to perform direct manipulation without having to remove wearable 6 from their wrist.

Communication units 58 may communicate with external devices via one or more wired and/or wireless networks by transmitting and/or receiving network signals on the one or more networks. Examples of communication units 58 include a network interface card (e.g. such as an Ethernet card), an optical transceiver, a radio frequency transceiver, a GPS receiver, or any other type of device that can send and/or receive information. Other examples of communication units 58 may include short wave radios, cellular data radios, wireless network radios (e.g., WIFI radios, BLUETOOTH radios, etc.), as well as universal serial bus (USB) controllers.

In some examples, wearable 6 may include one or more input components that are configured to receive input. Examples of input are tactile, audio, kinetic, presence, and optical input, to name only a few examples. The input components include, in one example, a mouse, keyboard, voice responsive system, video camera, buttons, control pad, microphone or any other type of device for detecting input from a human or machine. In some examples, the input components may include a presence-sensitive input component, which may include a presence-sensitive screen, touch-sensitive screen, radar, etc.

Communication module 60 may perform various operations to manage communications between wearable 6 and external devices. As one example, communication module 60 may receive data from sensors 10 (e.g., optical data from optical sensors 56 and/or motion data from motion sensors 54), and cause one or more of communication units 58 to wirelessly transmit a representation of the data to an external device (e.g., control device 8 of FIG. 1 and FIG. 3). As another example, where wearable 6 performs the functionality described herein as attributed to control device 8, communication module 60 may cause one or more of communication units 58 to transmit instructions to generate a graphical user interface to display device 4. In this way, in some examples, wearable 6 may internally process the data generated by sensors 10 to enable direct manipulation of graphical objects via wearable 6. As another example, communication module 60 may cause one or more of communication units 58 to transmit an indication of user input received via one or more input components of wearable 6 to an external device (e.g., control device 8 of FIG. 1 and FIG. 3). In this way, wearable 6 may enable a user to use the input components of wearable 6 to provide further input for interacting with the displayed graphical objects (e.g., enable the user to "click" on graphical objects).

While described as being a wearable computing device, it is understood that other devices may perform the functions ascribed to wearable 6. For instance, any computing device comprising sensors (e.g., one or more motion sensors and one or more optical sensors) and one or more wireless communication units may perform the functions ascribed to wearable 6. Some examples of such devices include smartphones, tablets, and the like.

Figure 3:
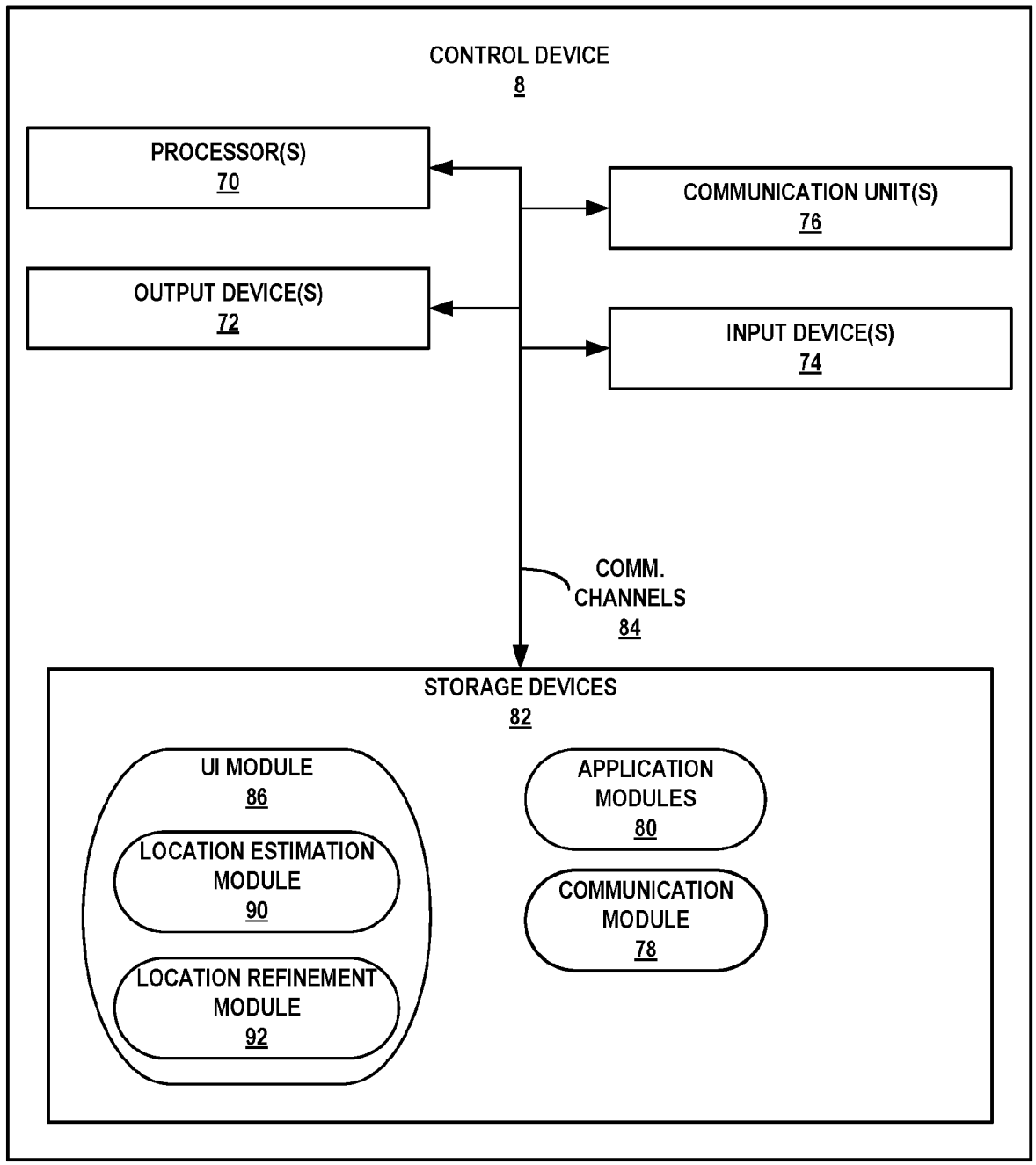
FIG. 3 is a block diagram illustrating an example control device configured to enable use of a wearable device for direct manipulation of displayed graphical objects, in accordance with one or more aspects of the present disclosure.

FIG. 3 is a block diagram illustrating an example control device configured to enable use of a wearable device for direct manipulation of displayed graphical objects, in accordance with one or more aspects of the present disclosure. Control device 8 of FIG. 3 is described below within the context of system 1 of FIG. 1. FIG. 3 illustrates only one particular example of control device 8 and many other examples of control device 2 may be used in other instances. Control device 8 of FIG. 3 may include a subset of the components included in example control device 8 or may include additional components not shown in FIG. 3.

As shown in the example of FIG. 3, control device 8 includes one or more processors 70, one or more output devices 72, one or more input devices 74, one or more communication units 76, and one or more storage devices 82. Storage devices 82 may also include user interface (UI) module 86, communication module 78, and application module 80.

Communication channels 84 may interconnect each of the components 70, 72, 74, 76, 82 for inter-component communications (physically, communicatively, and/or operatively). In some examples, communication channels 84 may include a power bus, a system bus, a network connection, an inter-process communication data structure, or any other method for communicating data or transferring power.

One or more output devices 72 may generate output. Examples of output are tactile, audio, and video output. Output devices 72, in one example, includes a presence-sensitive display, sound card, video graphics adapter card, speaker, cathode ray tube (CRT) monitor, liquid crystal display (LCD), or any other type of device for generating output to a human or machine.

One or more input devices 74 may receive input. Examples of input are tactile, audio, and video input. Input devices 74, in some examples, includes a presence-sensitive display, touch-sensitive screen, mouse, keyboard, voice responsive system, video camera, microphone, sensor, or any other type of device for detecting input from a human or machine.

One or more communication units 76 may communicate with external devices via one or more wired and/or wireless networks by transmitting and/or receiving network signals on the one or more networks. Examples of communication units 76 include a network interface card (e.g. such as an Ethernet card), an optical transceiver, a radio frequency transceiver, a GPS receiver, or any other type of device that can send and/or receive information. Other examples of communication units 76 may include short wave radios, cellular data radios, wireless network radios (e.g., WIFI radios, BLUETOOTH radios, etc.), as well as universal serial bus (USB) controllers, HDMI controllers, and the like.

Communication module 78 may perform various operations to manage communications between control device 8 and external devices. As one example, communication module 78 may receive data from one or more components of control device 8, and cause one or more of communication units 76 to transmit a representation of the data to an external device. For instance, communication module 78 may receive instructions to generate a graphical user interface from an application of application modules 80 and cause one or more of communication units 76 to transmit the instructions to display device 4. As another example, communication module 78 may receive data from one or more of communication units 76 that has been wirelessly received from an external device. For instance, communication module 78 may receive sensor data (e.g., one or both of motion data and optical data) from one or more of communication units 76 that has been wirelessly received from wearable 6.

One or more storage devices 82 within source control device 8 may store information for processing during operation of control device 8 that modules 86, 78, and 80 access during execution at control device 8). In some examples, storage device 82 is a temporary memory, meaning that a primary purpose of storage device 82 is not long-term storage. Storage devices 82 on control device 8 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 82, in some examples, include one or more computer-readable storage media. Storage devices 82 may be configured to store larger amounts of information than volatile memory. Storage devices 82 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 82 may store program instructions and/or information (e.g., data) associated with modules 86, 78, and 80.

One or more processors 70 may implement functionality and/or execute instructions within control device 8. For example, processors 70 may receive and execute instructions stored by storage devices 82 that execute the functionality of modules 86, 78, and 80. Processors 70 may execute instructions of modules 86, 78, and 80 to cause to perform various actions or functions of control device 8.

Application modules 80 represent all the various individual applications and services executing at and accessible from control device 8 that may utilize user input. A user may interact with a graphical user interface associated with one or more of application modules 80 to cause control device 8 to perform a function. Numerous examples of application modules 80 may exist and include, a fitness application, a calendar application, a personal assistant or prediction engine, a search application, a map or navigation application, a transportation service application (e.g., a bus or train tracking application), a social media application, a game application, a presentation application (e.g., for presenting slides), an e-mail application, a chat or messaging application, an Internet browser application, or any and all other applications that may execute at control device 8.

UI module 86 manages user interactions with other components of control device 8. In other words, UI module 86 may act as an intermediary between various components of control device 8 to make determinations based on user input and generate output in response to the user input. UI module 86 may receive instructions from an application, service, platform, or other module of control device 8 to cause a device (e.g., display device 4 of FIG. 1) to output a user interface. For instance, an application of application modules 80 may interact with UI module 86 to cause display device 4 to display a graphical user interface that includes one or more graphical objects. UI module 86 may manage inputs received by control device 8 as a user views and interacts with the user interface and update the user interface in response to receiving additional instructions from the application, service, platform, or other module of control device 8 that is processing the user input.

In accordance with one or more techniques of this disclosure, control device 8 may utilize sensor data generated by a wearable computing device in order to enable the wearable computing device to be used to provide direct manipulation of displayed graphical objects. For instance, UI module 86 may determine an estimated current location of a wearable device on a display device using motion data generated by a motion sensor of the wearable device. UI module 86 may use optical data generated by one or more optical sensors of the wearable device to refine the estimated location. An application module of application modules 80 (e.g., that is outputting a graphical user interface via the display device) may utilize the refined location of the wearable computing device as a location of user input. For instance, UI module 86 may provide the application module with the x,y coordinate of the refined location, and the application module may use the x,y coordinate as user input.

The application module may agnostic as to whether the techniques of this disclosure were used to generate the user input location. For instance, to the application module, the location of user input may appear the same as if it were generated using a standard touch screen. As such, the application module may not need to be modified in order to operate using user input locations determined using wearable device enabled direct manipulation as described herein.

In some examples, it may be desirable for a user to interact with displayed objects using input in addition to location. For instance, in addition to being able to a wearable computing device (e.g., wearable 6) to provide user input as a location, it may be desirable for the user to be able to provide user input such as clicks, scrolling, selecting, or other such things. In accordance with one or more techniques of this disclosure, control device 8 may receive data from the wearable computing device that represents user input received via one or more input components of the wearable computing device. For instance, UI module 86 may receive an indication that a user has tapped on a presence-sensitive display of the wearable computing device. UI module 86 may provide the application module with the representation of user input. For instance, where UI module 86 receives an indication that a user has tapped on a presence-sensitive display of the wearable computing device, UI module 86 may provide the application with user input indication that a click has been received at the x,y coordinate of the refined location.

FIGS. 4A-4F are conceptual diagrams illustrating an example location refinement process, in accordance with one or more techniques of this disclosure. The refinement process of FIGS. 4A-4F is described with reference to system 2 of FIG. 1 that includes display device 4, wearable 6, and control device 8.

Control device 8 may cause display device 4 to display a graphical user interface that includes one or more graphical objects. For instance, processors 70 of control device 8 may execute an application module of application modules 80. The executed application module may, with UI module 86, generate instructions to render the graphical user interface. Processors 70 may execute communication module 78 to cause communication units 76 to output the instructions to generate the graphical user interface to display device 4. In general, the graphical objects may be any graphical element that a user may interact with in order to modify operation of control device 8. Example graphical objects include, but are not limited to, dials, buttons, toggles, sliders, keys of a graphical keyboard, and the like.

A user may desire to directly manipulate one or more graphical objects included in the graphical user interface displayed at display device 4. However, in examples where display device 4 is not a presence-sensitive display, it may not be possible for the user to merely use their fingers to directly manipulate the displayed objects. As such, in accordance with one or more techniques of this disclosure and as discussed above, the user may utilize a wearable computing device to perform the direct manipulation. For instance, where wearable 6 is worn on a wrist of the user, the user may remove wearable 6 (e.g., undo attachment component 50) and utilize wearable 6 to directly manipulate the graphical objects.

Control device 8 may perform operations to enable the user to utilize wearable 6 to directly manipulate the graphical objects displayed at display device 4. As discussed above, in general, control device 8 may utilize motion data generated by motion sensors 54 of wearable 6 to determine an estimated location on display device 4, causing display device 4 to display a graphical pattern at the estimated location, and then refine the estimated location based on optical data generated by optical sensors 56 of wearable 6.

Initially, control device 8 may not be able to determine an estimated location of wearable 6. For instance, before the user places wearable 6 against display device 4, control device 8 may not be able to determine a location of wearable 6. As such, for the initial location, control device 8 may output the graphical pattern at a location on display device 4 with an instruction for the user to place wearable 6 at the location of the displayed graphical pattern. Control device 8 may always use a particular location on display device 4 as the initial location, or may use different locations depending on context. Once the user places wearable 6 on display device 4 at the location of the displayed graphical pattern, control device 8 may begin to refine the determined location of wearable 6.

The graphical pattern output at display device 4 may be designed to facilitate detection by optical sensors, such as optical sensors 56 of wearable 6. In general, the graphical pattern may include a plurality of regions that each have a different optical characteristic. As shown in FIG. 1 and FIGS. 4A-4F, graphical pattern 12 includes center region 14 and a plurality of border regions 16 dispersed about center region 14. While illustrated as including four border regions, the graphical pattern may include any number of border regions. For instance, in some examples, the graphical pattern may include 5, 6, 7, 8, 9, 10, 12, or more border regions.

Each of the border regions may be associated with an adjustment direction. The adjustment direction of a particular border region may represent a spatial relationship between the border region and the center region. As one example, the adjustment direction of border region 16A may be 315° (e.g., the direction heading from center region 14 to border region 16A). Similarly, the adjustment direction of border region 16B may be 45°, the adjustment direction of border region 16C may be 225°, and the adjustment direction of border region 16D may be 135°. As discussed in further detail below, responsive to optical data indicating that a particular border region of border regions 16 is displayed under wearable 6, control device 8 may adjust the estimated location of wearable 6 in the adjustment direction corresponding to the particular border region.

Figure 4A:
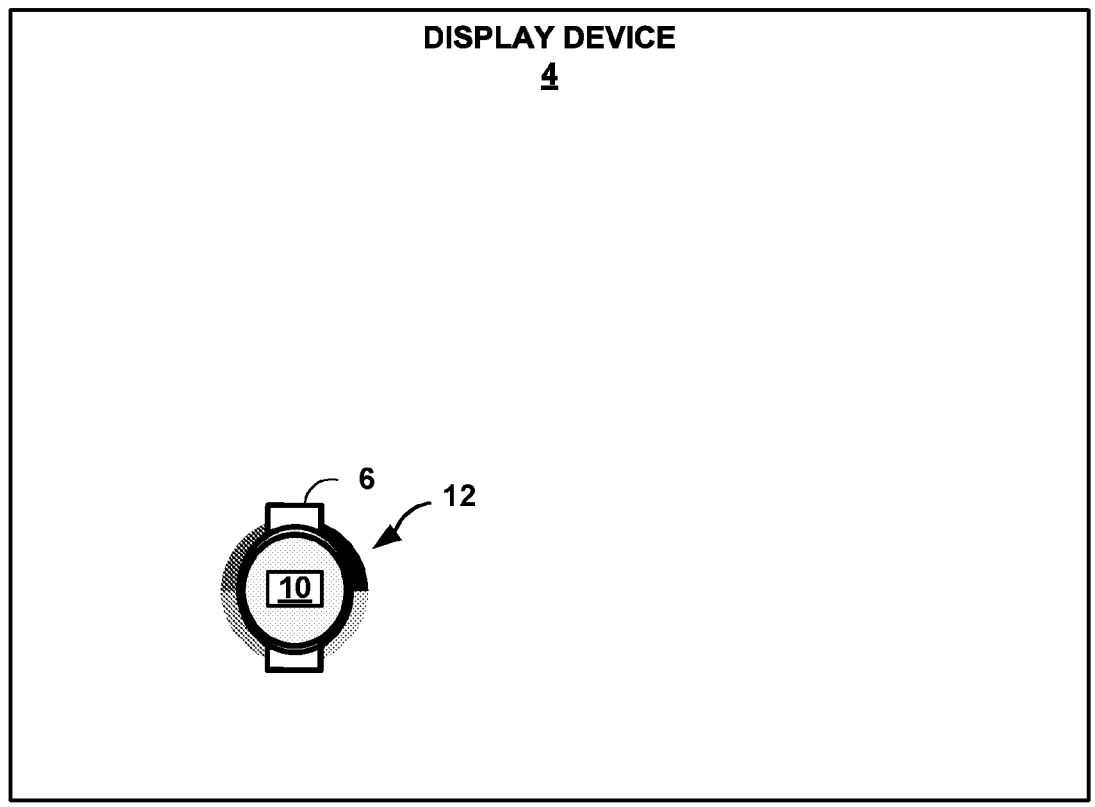
FIGS. 4A-4F are conceptual diagrams illustrating an example location refinement process, in accordance with one or more techniques of this disclosure.

As shown in FIG. 4A, the user may initially place wearable 6 at the location on display device 4 at which graphical pattern 12 is displayed. While the user is using wearable 6 to perform direct manipulation, control device 8 may use a location of the displayed graphical pattern as user input. For instance, UI module 86 of control device 8 may utilize the x,y coordinate of a centroid of center region 14 of graphical pattern 12 as user input for an application of application modules 80 executing at control device 8.

Figure 4B:
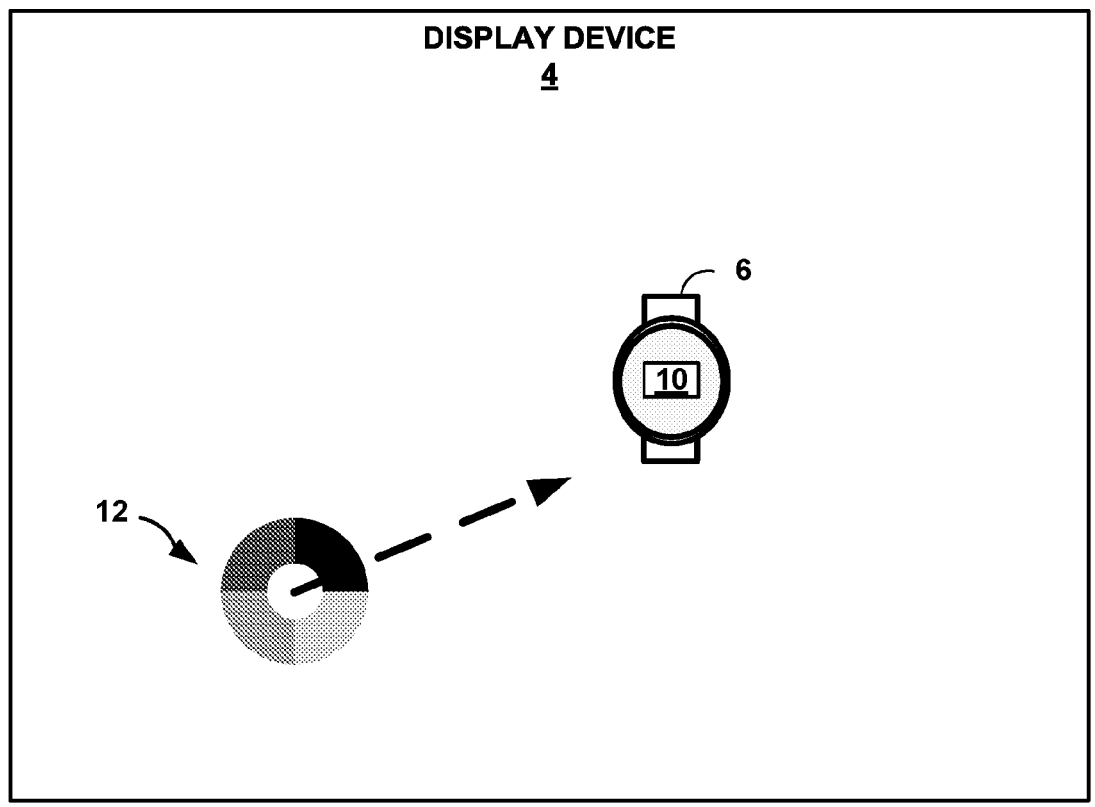

As shown in FIG. 4B, the user may move wearable 6 across display device 4. As wearable 6 is moved, motion sensors 54 may generate motion data that represents the movement. Location estimation module (LEM) 90 of control device 8 may determine an updated estimated location of wearable 6 based on the motion data. For instance, LEM 90 may perform a double integration of acceleration data generated by accelerometers of motion sensors 54, and add the resulting value to the previously known location of wearable 6 (i.e., the location at which graphical pattern 12 was displayed before wearable 6 was moved).

Figure 4C:
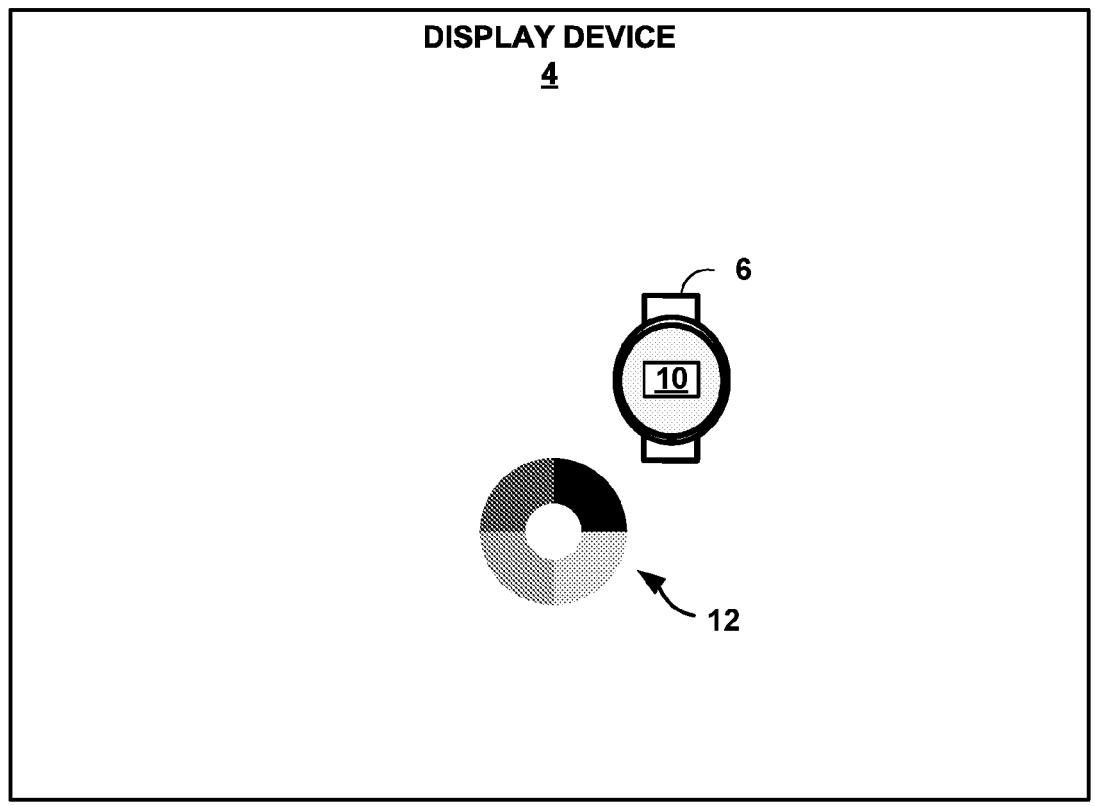

As shown in FIG. 4C, control device 8 may cause display device 4 to output graphical pattern 12 at the updated estimated location. Depending on the accuracy of the location estimate, graphical pattern 12 may or may not be displayed at the actual location of wearable 6. Location refinement module (LRM) 92 of control device 8 may refine the estimated location based on optical data generated by one or more optical sensors 56 of wearable 6.

One of three scenarios is possible during any point during the refinement process. In a first scenario, graphical pattern 12 may not be displayed under wearable 6 (e.g., optical sensors 56 may not be able to detect any region of graphical pattern 12). In a second scenario, one of border regions 16 of graphical pattern 12 may be displayed under wearable 6. In a third scenario, center region 14 of graphical pattern 12 may be displayed under wearable 6. LRM 92 may determine which scenario is occurring based on optical data generated by one or more optical sensors 56. As one example, where the optical data indicates that no regions of center region 14 and border regions 16 are detected, LRM 92 may determine that the first scenario is occurring. As another example, where the optical data indicates that a particular border region of border regions 16 is detected, LRM 92 may determine that the second scenario is occurring. As another example, where the optical data indicates that center region 14 is detected, LRM 92 may determine that the third scenario is occurring.

LRM 92 may perform a particular action based on the determined scenario. Responsive to determining that the first scenario is occurring (e.g., that no regions of graphical pattern 12 are detected), LRM 92 may increase a display size of graphical pattern 12. In other words, responsive to determining that none of the plurality of regions of graphical pattern 12 are detected, LRM 92 may cause display device 4 to output graphical pattern 12 at an increased size relative to a current size. By increasing the display size of graphical pattern 12, LRM 92 may increase the likelihood that a region of graphical pattern 12 will be detected in the optical data. An example of the size increase can be seen in FIGS. 4C and 4D.

Figure 4D:
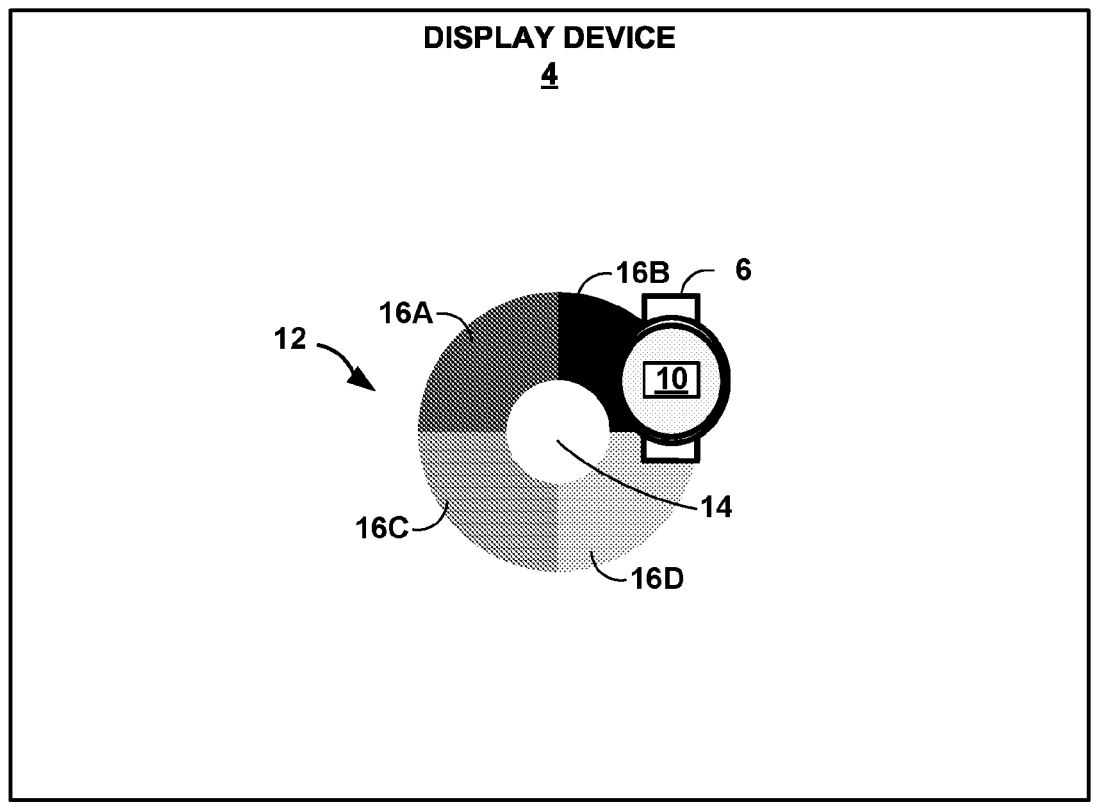
Figure 4E:
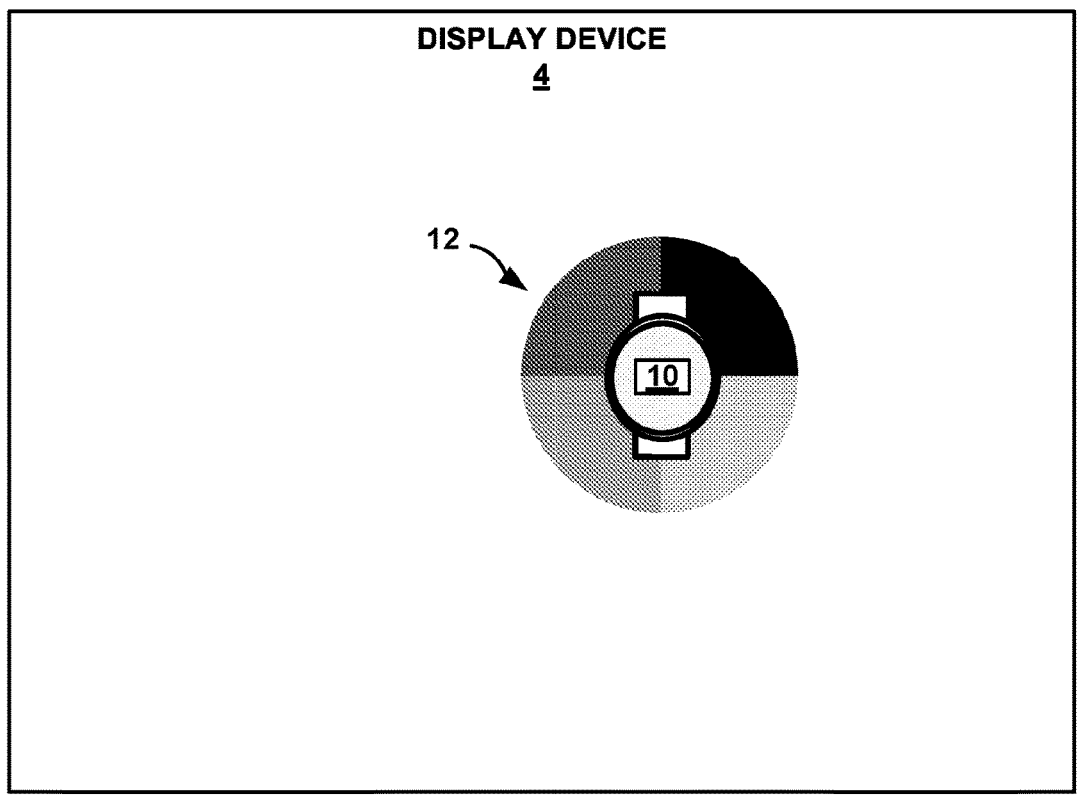
Figure 4F:
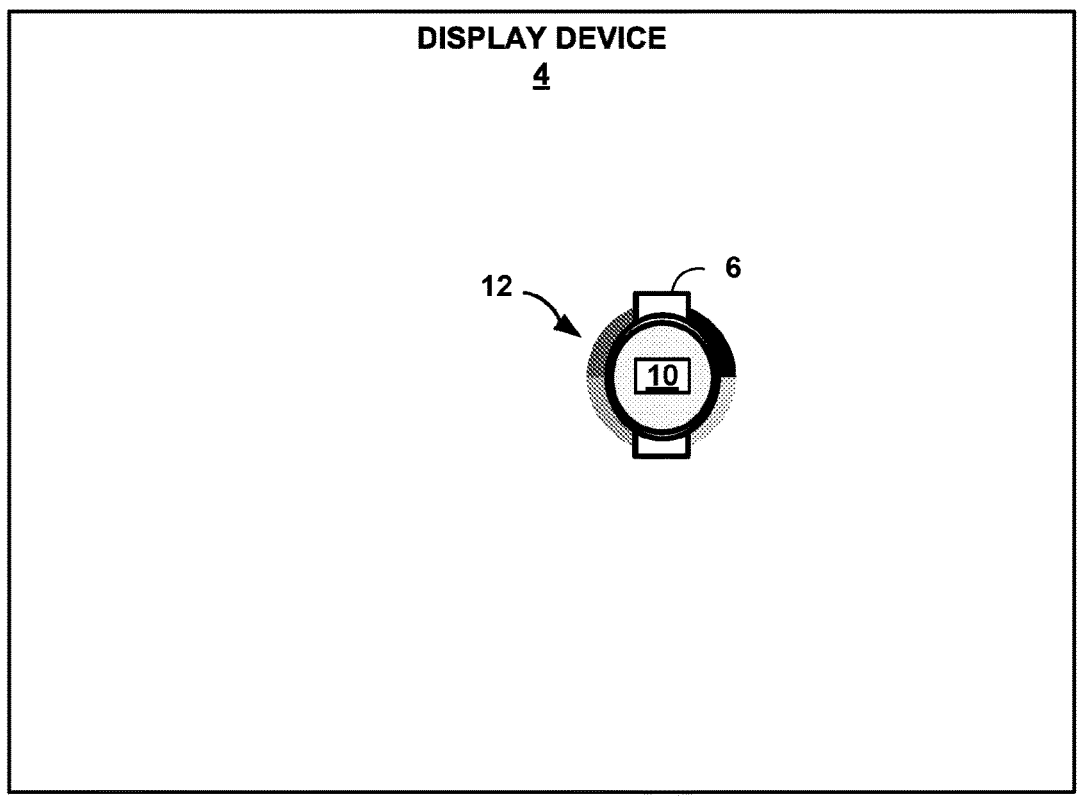

Responsive to determining that the second scenario is occurring (e.g., that a particular border region of border regions 16 is detected), LRM 92 may adjust a displayed location of graphical pattern 12. For instance, responsive to determining that a particular border region of border regions 16 is detected, LRM 92 may determine, based on the particular border region, an adjustment direction. As discussed above, each border region of border regions 16 may be associated with a respective adjustment direction that represents a spatial relationship between the respective border region and center region 14. LRM 92 may adjust, in the adjustment direction, the estimated location to obtain a refined location. In the example of FIGS. 4D and 4E, LRM 92 may determine that border region 16B is detected, determine that the adjustment direction corresponding to border region 16B is a heading of 45°, and move a displayed location of graphical pattern 12 a distance with a heading of 45°. The distance that LRM 92 moves graphical pattern 12 may be a function of the current display size of graphical pattern 12. For example, the distance may be one-half of a radius of the current display size of graphical pattern 12.

Responsive to determining that the third scenario is occurring (e.g., that the center region is detected), LRM 92 may decrease a display size of graphical pattern 12. In other words, responsive to determining that center region 14 of graphical pattern 12 is detected, LRM 92 may cause display device 4 to output graphical pattern 12 at a reduced size relative to a current size. By reducing the display size of graphical pattern 12, LRM 92 may reduce the amount of the graphical user interface covered up/occluded by graphical pattern 12. In some examples, LRM 92 may reduce the size of graphical pattern 12 to a point where graphical pattern 12 is not visible around wearable 6 (e.g., graphical pattern 12 may be totally occluded by wearable 6). An example of the size decrease can be seen in FIGS. 4E and 4F.

It is noted that control device 8 may continue to perform the refinement process until one or more conditions are met and/or until wearable 6 is moved again. One example condition includes graphical pattern 12 reaching a minimum display size. The minimum display size may be selected based on a size of wearable 6 (e.g., such that the minimum display size is the same as, or slightly smaller than, the size of wearable 6).

It is further noted that certain refinement operations may trigger other scenarios. For instance, reducing the display size of graphical pattern 12 may result in center region 14 no longer being detected in the optical data (e.g., and either a border region is detected or no region is detected). As one specific example, after reducing the display size of graphical pattern 12, control device 8 may determine that a border region is now detected and may adjust the display location of graphical pattern 12 based on the detected border region. This process may loop until a minimum size of graphical pattern 12 is reached.

Figure 5:
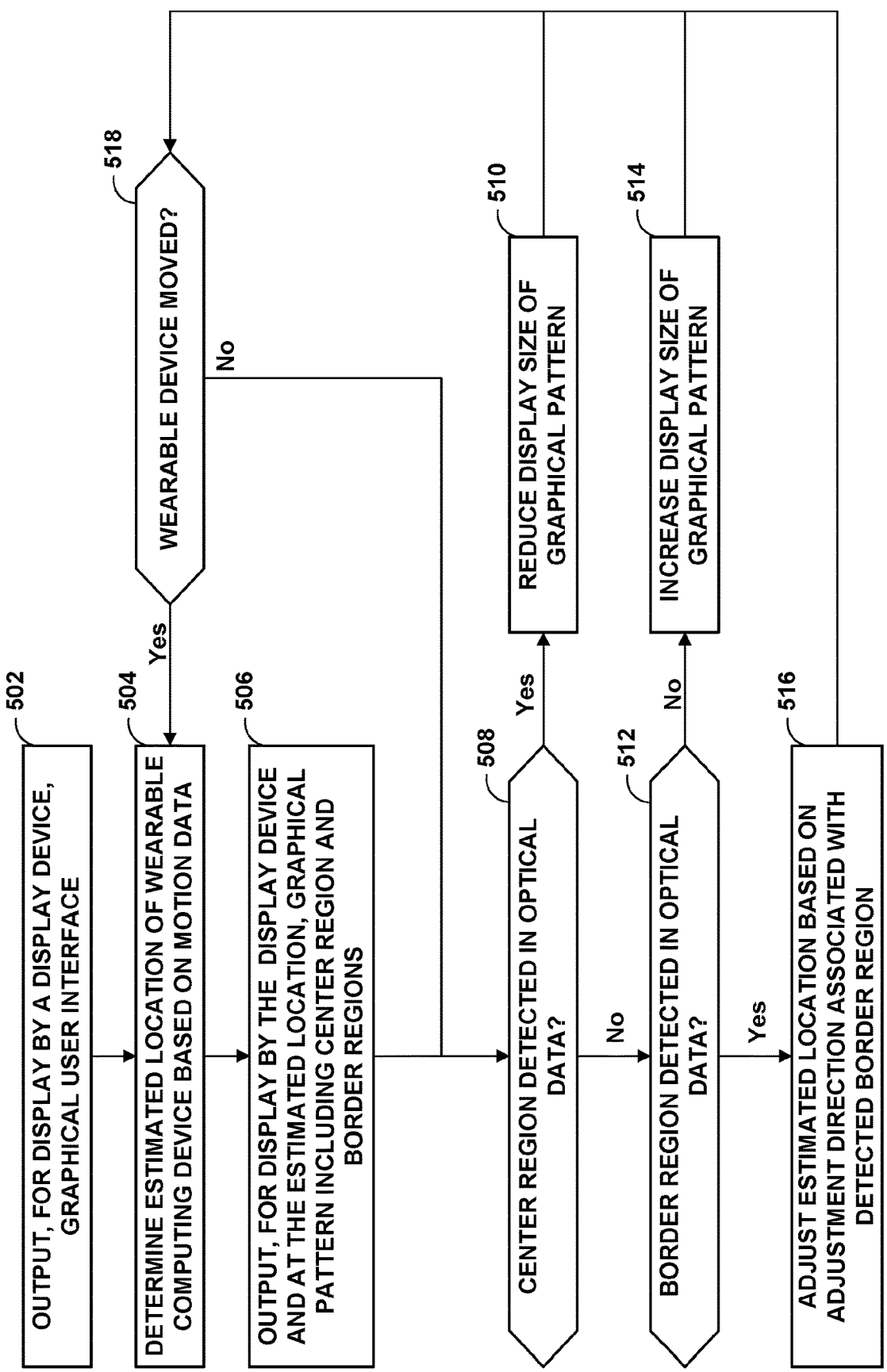
FIG. 5 is a flow diagram illustrating example operations of a device to enable use of a wearable device for direct manipulation of displayed graphical objects, in accordance with one or more techniques of the present disclosure.

FIG. 5 is a flow diagram illustrating example operations of a device to enable use of a wearable device for direct manipulation of displayed graphical objects, in accordance with one or more techniques of the present disclosure. The techniques of FIG. 5 may be performed by one or more processors of a device, such as control device 8 of FIG. 1 and FIG. 3. For purposes of illustration, the techniques of FIG. 5 are described within the context of control device 8 of FIG. 1 and FIG. 3, although computing devices having configurations different than that of control device 8 may perform the techniques of FIG. 5. As one example, one or more processors of display device 4 of FIG. 1 may perform the techniques of FIG. 5. As another example, one or more processors of wearable 6 of FIG. 1 and FIG. 2 may perform the techniques of FIG. 5. As another example, one or more processors of a mobile computing device other than display device 4 and wearable 6 may perform the techniques of FIG. 5.

Control device 8 may output, for display by a display device, a graphical user interface (502). For instance, processors 70 of control device 8 may execute an application module of application modules 80 and the executed application module may, with UI module 86, generate instructions to render the graphical user interface. Processors 70 may execute communication module 78 to cause communication units 76 to output the instructions to generate the graphical user interface to display device 4.

Control device 8 may determine, based on motion data, an estimated location of a wearable computing device (504). For instance, control device 8 may wirelessly receive acceleration data generated by accelerometers of motion sensors 54 of wearable 6, and LEM 90 of control device 8 may perform a double integration of acceleration data, and add the resulting value to a previously known location of wearable 6.

Control device 8 may output, for display by the display device and at the estimated location, a graphical pattern including a center region and a plurality of border regions (506). For instance, LRM 92 may insert graphical pattern 12 into the graphical user interface generated by the application module (e.g., such that the graphical pattern is overlaid on top of other elements of the graphical user interface).

Control device 8 may determine, based on optical data generated by an optical sensor of the wearable computing device, a refined location of the wearable computing device. For instance, LRM 92 may process optical data generated by an optical sensor of optical sensors 56 of wearable 6 to determine if the optical data indicates matches an optical characteristic of a region of graphical pattern 12. Responsive to determining that a center region is detected in the optical data ("Yes" branch of 508), LRM 92 may reduce a display size of graphical pattern 12 (510). Responsive to determining that neither the center region or any border regions are detected in the optical data ("No" branch of 512), LRM 92 may increase a display size of graphical pattern 12 (514). Responsive to determining that a border region is detected in the optical data ("Yes" branch of 512), LRM 92 may adjust the estimated location based on an adjustment direction associated with the detected border region (516).

Control device 8 may determine whether the wearable device has moved (518). For instance, control device 8 may determine, based on motion data generated by motion sensors 54, whether an acceleration of wearable computing device 6 is greater than an acceleration threshold. Responsive to determining that the wearable device has moved ("Yes" branch of 518), control device 8 may determine, based on motion data that represents the movement, an updated estimated location of a wearable computing device (504). Responsive to determining that the wearable device has not moved ("No" branch of 518), LRM 92 may continue to perform the refinement operations (508-516).

As discussed above, the graphical pattern may be displayed overlaid on other elements of the graphical user interface. In some examples, control device 8 may perform one or more operations to reduce the likelihood that the graphical pattern will be "confused" for other elements of the graphical user interface. For instance, while causing the display device to display the graphical pattern, control device 8 may causing the display device to blink the graphical pattern at a predetermined rate (e.g., every 1, 2, 3, 4, 5 frames).

Figure 6A:
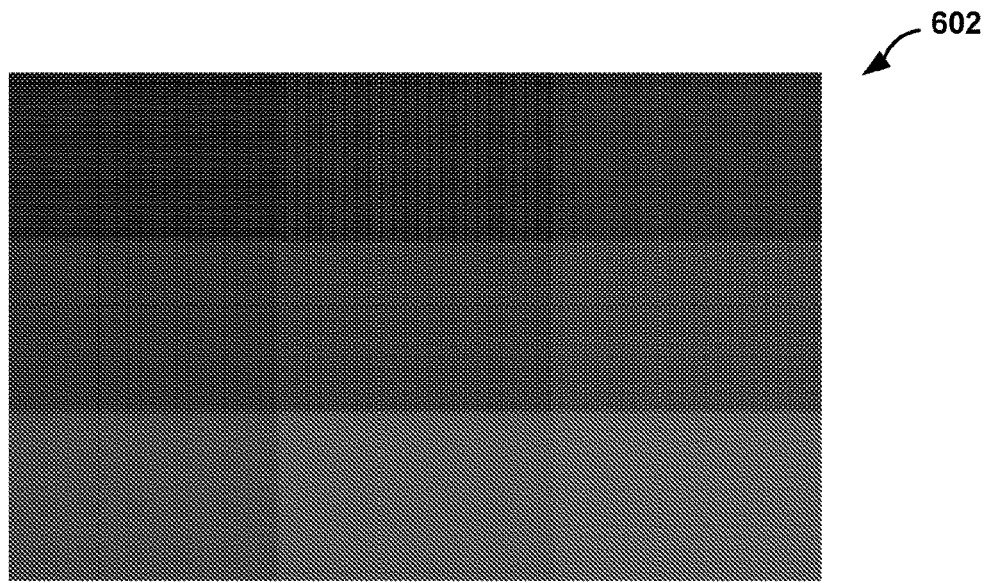
FIGS. 6A-6C are example graphical patterns that may be used for global initialization, in accordance with one or more techniques of this disclosure.
Figure 6B:
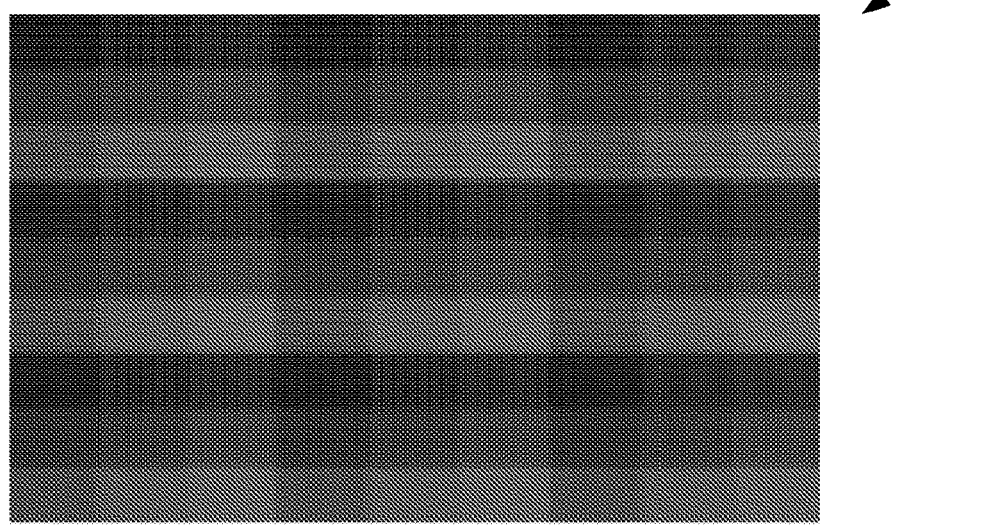
Figure 6C:
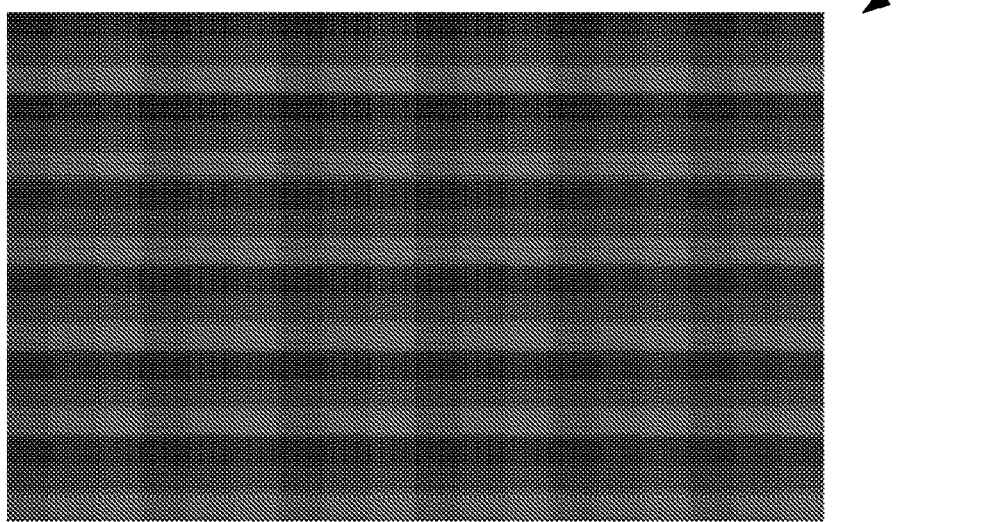

FIGS. 6A-6C are example graphical patterns that may be used for global initialization, in accordance with one or more techniques of this disclosure. As discussed above, in some examples, control device 8 may determine an initial location of wearable 6 by displaying a graphical pattern (e.g., graphical pattern 12 of FIG. 1) at a particular location on display device 4 (e.g., the particular location functions as the initial location). In other examples, control device 8 may be configured to determine an initial location of wearable 6 on display device 4 by displaying various graphical patterns across an entirety of display device 4 (whereas graphical pattern 12 takes up less than all of display device 4). Some example graphical patterns are shown in FIGS. 6A-6C. To perform the global initialization technique using the graphical patterns shown in FIGS. 6A-6C, control device 8 flash one or more of graphical patterns 602, 604, and 606 on the whole display area of display device 4 (e.g., such that a portion of the graphical pattern will be at the location of wearable 6, regardless of where on display device 4 the user has placed wearable 6).

The following numbered examples may illustrate one or more aspects of this disclosure:

Example 1. A method comprising: determining, by one or more processors, an estimated location of a wearable computing device on a display device that is not presence-sensitive, wherein the wearable computing device is configured to be worn on a wrist of a user; causing the display device to output, at the estimated location, a graphical pattern; determining, by the one or more processors and based on optical data generated by an optical sensor of the wearable computing device, a refined location of the wearable computing device; and utilizing, by the one or more processors, the refined location of the wearable computing device as a location of user input for an application outputting a graphical user interface via the display device.

Example 2. The method of example 1, wherein determining the estimated location comprises: determining, based on motion data generated by one or more motion sensors of the wearable computing device, the estimated location.

Example 3. The method of example 1 or 2, wherein the graphical pattern comprises a plurality of regions including a center region and a plurality of border regions dispersed about the center region, wherein each region of the plurality of regions has a different optical characteristic, and wherein determining the refined location comprises: determining, based on the optical data, whether any of the plurality of regions are detected; responsive to determining that a particular border region of the plurality of border regions is detected, determining, based on the particular border region, an adjustment direction; and adjusting, in the adjustment direction, the estimated location to obtain the refined location.

Example 4. The method of any of examples 2 or 3, wherein determining the refined location further comprises: responsive to determining that none of the plurality of regions are detected, causing the display device to output the graphical pattern at an increased size relative to a current size.

Example 5. The method of any of examples 2-4, wherein determining the refined location further comprises: responsive to determining that the center region of the plurality of regions is detected, causing the display device to output the graphical pattern at a reduced size relative to a current size.

Example 6. The method of any of examples 1-5, wherein causing the display device to output the graphical pattern comprises: causing the display device to blink the graphical pattern at a predetermined rate.

Example 7. The method of any of examples 1-6, wherein the optical sensor of the wearable computing device comprises a photoplethysmogram sensor.

Example 8. The method of any of examples 1-7, wherein the one or more processors are included in the display device.

Example 9. The method of any of examples 1-7, wherein the one or more processors are included in the wearable computing device.

Example 10. The method of any of examples 1-7, wherein the one or more processors are included in another device that is different than the wearable computing device and the display device, the method further comprising: receiving, by the other device and from the wearable computing device, the optical data; and causing the display device to output the graphical user interface.

Example 11. A computing device comprising; one or more processors; and a memory comprising instructions that, when executed by the one or more processors, cause the one or more processors to perform the method of any of examples 1-10.

Example 12. A computer-readable storage medium storing instructions that, when executed, cause one or more processors to perform the method of any of examples 1-10.

Example 13. A device comprising means for performing the method of any of examples 1-10.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
  determining, by one or more processors, an estimated location of a wearable computing device on a display device that is not presence-sensitive, wherein the wearable computing device is configured to be worn on a wrist of a user, and wherein determining the estimated location of the wearable computing device comprises determining the estimated location of the wearable computing device while the wearable computing device is placed against the display device;
  causing the display device to output, at the estimated location, a graphical pattern;
  determining, by the one or more processors and based on optical data generated by an optical sensor of the wearable computing device, a refined location of the wearable computing device; and
  utilizing, by the one or more processors, the refined location of the wearable computing device as a location of user input for an application outputting a graphical user interface via the display device.

2. The method of claim 1, wherein determining the estimated location comprises:
  determining, based on motion data generated by one or more motion sensors of the wearable computing device, the estimated location.

3. The method of claim 2, wherein the graphical pattern comprises a plurality of regions including a center region and a plurality of border regions dispersed about the center region, wherein each region of the plurality of regions has a different optical characteristic, and wherein determining the refined location comprises:

determining, based on the optical data, whether any of the plurality of regions are detected;

responsive to determining that a particular border region of the plurality of border regions is detected, determining, based on the particular border region, an adjustment direction; and adjusting, in the adjustment direction, the estimated location to obtain the refined location.

4. The method of claim 3, wherein determining the refined location further comprises:

responsive to determining that none of the plurality of regions are detected, causing the display device to output the graphical pattern at an increased size relative to a current size.

5. The method of claim 3, wherein determining the refined location further comprises:

responsive to determining that the center region of the plurality of regions is detected, causing the display device to output the graphical pattern at a reduced size relative to a current size.

6. The method of claim 1, wherein causing the display device to output the graphical pattern comprises:

causing the display device to blink the graphical pattern at a predetermined rate.

7. The method of claim 1, wherein the optical sensor of the wearable computing device comprises a photoplethysmogram sensor.

8. The method of claim 1, wherein the one or more processors are included in the display device.

9. The method of claim 1, wherein the one or more processors are included in the wearable computing device.

10. The method of claim 1, wherein the one or more processors are included in another device that is different than the wearable computing device and the display device, the method further comprising:

receiving, by the other device and from the wearable computing device, the optical data; and causing the display device to output the graphical user interface.

11. A control device comprising;

one or more processors; and a memory comprising instructions that, when executed by the one or more processors, cause the one or more processors to:

determine, while a wearable computing device is placed against a display device that is not presence-sensitive, an estimated location of the wearable computing device on the display device, wherein the wearable computing device is configured to be worn on a wrist of a user;

cause the display device to output, at the estimated location, a graphical pattern;

determine, based on optical data generated by an optical sensor of the wearable computing device, a refined location of the wearable computing device; and utilize the refined location of the wearable computing device as a location of user input for an application outputting a graphical user interface via the display device.

12. The control device of claim 11, wherein the instructions that cause the one or more processors to determine the estimated location comprise instructions that cause the one or more processors to:

determine, based on motion data generated by one or more motion sensors of the wearable computing device, the estimated location.

13. The control device of claim 12, wherein the graphical pattern comprises a plurality of regions including a center region and a plurality of border regions dispersed about the center region, wherein each region of the plurality of regions has a different optical characteristic, and wherein the instructions that cause the one or more processors to determine the refined location comprise instructions that cause the one or more processors to:

determine, based on the optical data, whether any of the plurality of regions are detected;

responsive to determining that a particular border region of the plurality of border regions is detected, determine, based on the particular border region, an adjustment direction; and adjust, in the adjustment direction, the estimated location to obtain the refined location.

14. The control device of claim 13, wherein the instructions that cause the one or more processors to determine the refined location further comprise instructions that cause the one or more processors to:

cause, responsive to determining that none of the plurality of regions are detected, the display device to output the graphical pattern at an increased size relative to a current size.

15. The control device of claim 13, wherein the instructions that cause the one or more processors to determine the refined location further comprise instructions that cause the one or more processors to:

cause, responsive to determining that the center region of the plurality of regions is detected, the display device to output the graphical pattern at a reduced size relative to a current size.

16. The control device of claim 11, wherein the instructions that cause the one or more processors to cause the display device to output the graphical pattern comprise instructions that cause the one or more processors to:

cause the display device to blink the graphical pattern at a predetermined rate.

17. The control device of claim 11, wherein the optical sensor of the wearable computing device comprises a photoplethysmogram sensor.

18. The control device of claim 11, wherein the one or more processors are included in the display device, further comprising instructions that cause the one or more processors to:

receive, by the display device and from the wearable computing device, the optical data.

19. The control device of claim 11, wherein the one or more processors are included in the wearable computing device, further comprising instructions that cause the one or more processors to:

cause the display device to output the graphical user interface.

20. The control device of claim 11, wherein the one or more processors are included in another device that is different than the wearable computing device and the display device, further comprising instructions that cause the one or more processors to:

receive, by the other device and from the wearable computing device, the optical data; and cause the display device to output the graphical user interface.

21. A non-transitory computer-readable storage medium storing instructions that, when executed, cause one or more processors to:
  cause a display device to output a graphical user interface, the graphical user interface generated by an application executing at the one or more processors, wherein the display device is not presence-sensitive;
  determine, based on motion data generated by one or more motion sensors of a wearable computing device, an estimated location of the wearable computing device on the display device while the wearable computing device is placed against the display device;
  cause the display device to output, at the estimated location, a graphical pattern;
  determine, based on optical data generated by an optical sensor of the wearable computing device, a refined location of the wearable computing device; and
  utilizing the refined location of the wearable computing device as a location of user input for the application.

* * * * *